United States Patent [19]

Anders

[11] E Patent Number: Re. 33,397

[45] Reissued Date of Patent: Oct. 23, 1990

[54] DISPOSABLE PAN

[76] Inventor: Gary P. Anders, 1964 Keats Crt., Highland Park, Ill. 60035

[21] Appl. No.: 452,640

[22] Filed: Dec. 18, 1989

Related U.S. Patent Documents

Reissue of:

[64] Patent No.: 4,717,038
Issued: Jan. 5, 1988
Appl. No.: 11,036
Filed: Feb. 5, 1987

[51] Int. Cl.[5] ..... B65D 5/46

[52] U.S. Cl. ..... 220/94 R; 220/95; 220/71; 294/265

[58] Field of Search ..... 220/94 R, 95, 96, 19, 220/71; 294/26.5

[56] References Cited

U.S. PATENT DOCUMENTS

| | | | |
|---|---|---|---|
| 944,777 | 12/1909 | Feldman | 220/96 |
| 1,097,398 | 5/1914 | Dennis | 294/26.5 X |
| 1,265,611 | 5/1918 | Clark | 220/95 X |
| 2,139,598 | 12/1938 | McMullen | 220/94 R |
| 2,585,468 | 2/1952 | Bitney | 220/95 X |
| 2,673,806 | 3/1954 | Colman | 220/94 R X |
| 2,983,402 | 5/1961 | Gottsegen | 220/95 X |
| 3,148,476 | 9/1964 | Ethridge | 220/94 R X |
| 3,647,077 | 3/1972 | Gillespie | 220/19 X |

*Primary Examiner*—Steven M. Pollard
*Attorney, Agent, or Firm*—Gerstman & Ellis, Ltd.

[57] ABSTRACT

A disposable oven pan is formed of stamped aluminum sheet material having a bottom, side walls and a rim at the periphery of the side walls. A pair of handles are fastened to the rim at opposed locations. Stabilizing bars bridge the connection points of each handle. A pair of support wires extend from the handle connection points, adjacent the outside of the side walls and under and adjacent the bottom of the pan for providing structural support to the pan. The handles, stabilizing bars and support wires are formed of steel, enabling the aluminum sheet to be relatively thin yet supportive of relatively heavy loads.

21 Claims, 1 Drawing Sheet

FIG. 1
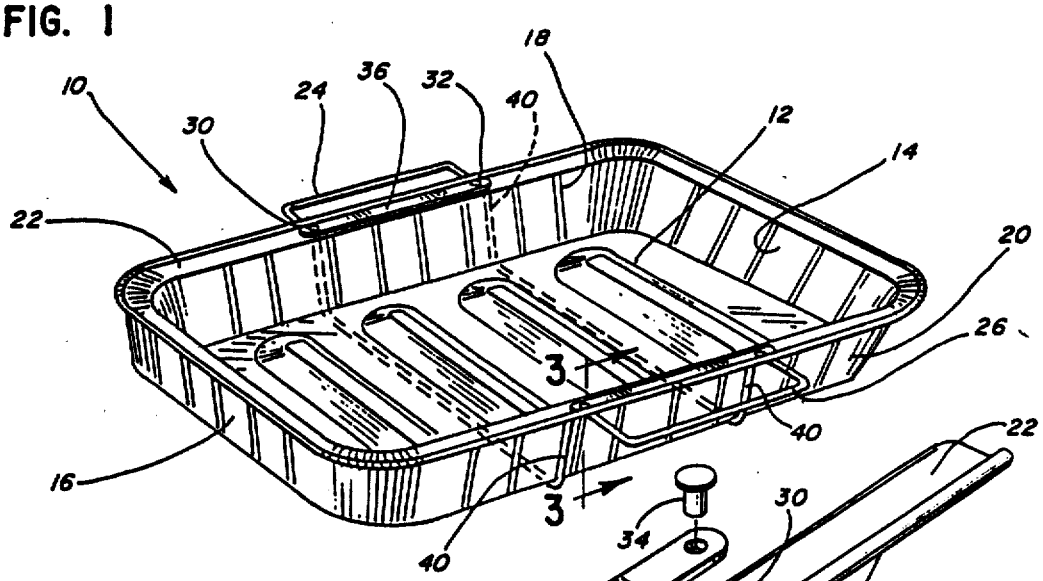
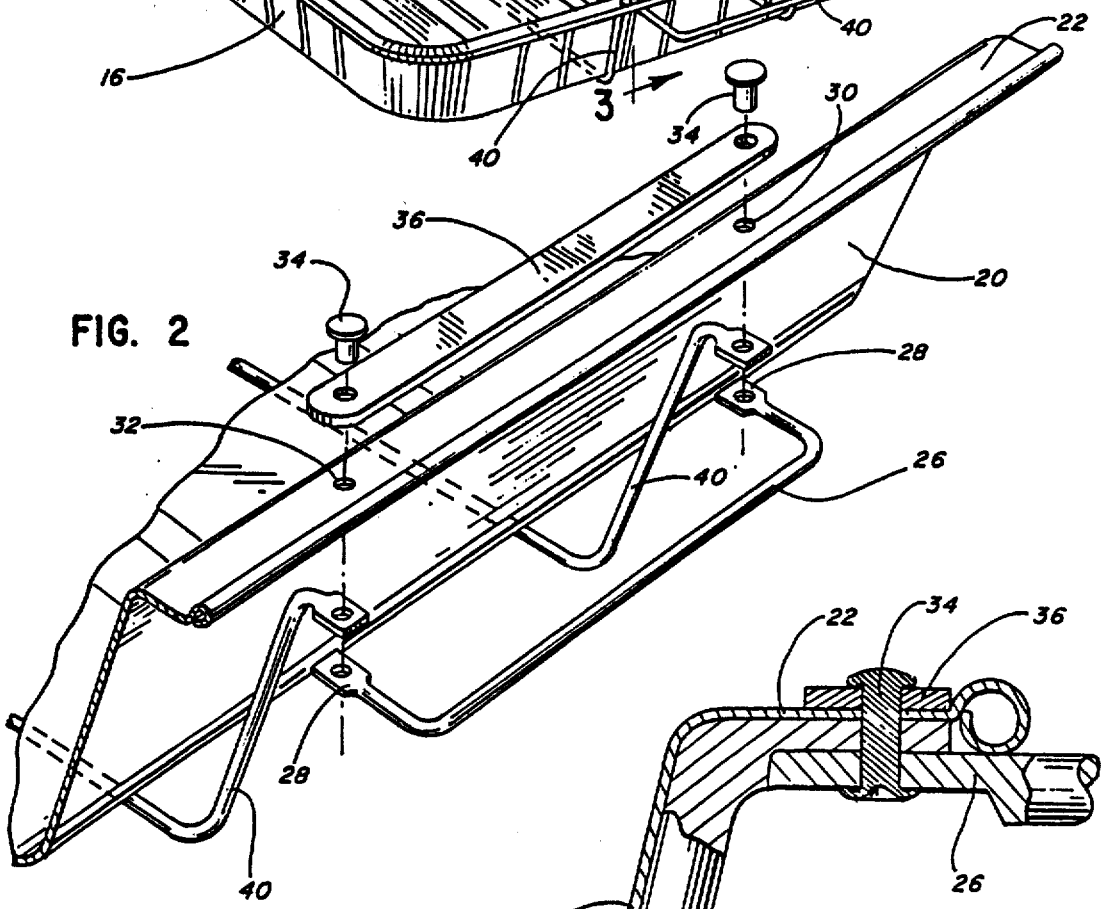
FIG. 2
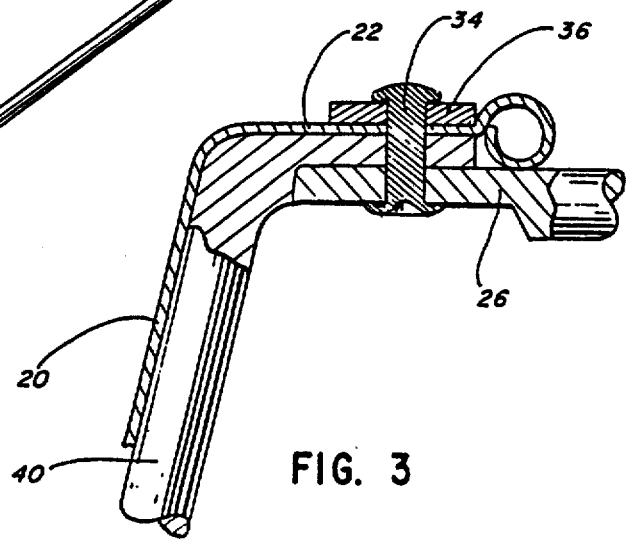
FIG. 3

DISPOSABLE PAN

Matter enclosed in heavy brackets [ ] appears in the original patent but forms no part of this reissue specification; matter printed in italics indicates the additions made by reissue.

FIELD OF THE INVENTION

The present invention concerns a novel disposable pan. The illustrative embodiment is a disposable aluminum pan used for broiling, baking and the like.

BACKGROUND OF THE INVENTION

Prior art disposable pans, formed of stamped aluminum sheet, are widely used today. Conventionally the aluminum is 0.0065 inch in thickness and such pans come in a variety of shapes, often rectilinear with two ends and two sides, or curvilinear with a generally elliptical shape.

The disposable pans used for baking or broiling poultry, for example, may be formed of 0.0065 inch thick stamped aluminum sheet and may be suitable for supporting 20 pounds. The rectangular pans have the problem of bending when they are lifted, sometimes causing the hot juices to spill over. Typically the pans are lifted from underneath, and well-insulated gloves are required in order to prevent burns. Even well-insulated gloves may be difficult to use because of the high heat condition of the disposable pan and the bending problem.

I have invented a disposable pan that alleviates many of the difficulties with respect to prior art disposable pans. The disposable pan of the present invention may be formed of thinner aluminum sheet material than prior art aluminum pans, yet it has the ability to support greater weight. For example, a disposable pan constructed in accordance with the present invention may be formed of 0.004 inch aluminum sheet, yet support over 70 pounds. However, the disposable pan of the present invention may be constructed for approximately the same cost as prior art disposable pans, notwithstanding the increased effectiveness of the present invention. This is because the aluminum is the most expensive portion of the item, and the aluminum in the present invention is thinner than the aluminum used in prior art pans, therefore lowering the cost of the pan of the present invention. In addition, the pan of the present invention alleviates the bending problem concomitant with prior art rectangular disposable aluminum pans.

It is, therefore, an object of the present invention to provide a disposable pan that is simple in construction and economical to manufacture.

Another object of the present invention is to provide a disposable pan that is sturdier in construction than prior art disposable pans.

A still further object of the present invention is to provide a disposable pan that can easily be handled by the user, without requiring the pan to be lifted from underneath.

Other objects and advantages of the present invention will become apparent as the description proceeds.

SUMMARY OF THE INVENTION

In accordance with the present invention, an oven pan is provided which comprises a disposable stamped aluminum pan structure having a bottom, side walls and a rim at the periphery of the side walls. A first handle is fastened to the rim at a first location thereof. First means are provided for fastening the first handle to two spaced points on the rim. First stabilizing means bridge the two spaced points.

A second handle is fastened to the rim at a second location thereof, opposed to the first location. Second means are provided for fastening the second handle to two spaced points on the rim. Second stabilizing means are provided for bridging the last-mentioned two spaced points.

In the illustrative embodiment, the stamped aluminum has a thickness of between 0.003 inch and 0.005 inch, preferably 0.004 inch. Each of the handles has a generally U-shaped configuration, with the fastening means being connected to the ends of the U.

In the illustrative embodiment, the stabilizing means comprises an elongated bar bridging the two spaced points on the rim to which the handle is connected. The handles and the stabilizing means are formed of cold rolled steel, while the remainder of the pan is formed of aluminum sheet.

In the illustrative embodiment, support means are provided which extend from the first handle to the second handle and underlie the bottom of the pan. The support means comprise a pair of wires formed to extend adjacent the outside of the side walls and under and adjacent the bottom of the pan. In the illustrative embodiment, the support means are formed of cold rolled steel.

A more detailed explanation of the invention is provided in the following description and claims, and is illustrated in the accompanying drawings.

BRIEF DESCRIPTION OF THE DRAWINGS

FIG. 1 is a perspective view of a disposable oven pan, constructed in accordance with the principles of the present invention;

FIG. 2 is an exploded view of one side of the pan of FIG. 1; and

FIG. 3 is an enlarged cross-sectional view, taken along the plane of the line 3—3 of FIG. 1.

DETAILED DESCRIPTION OF THE ILLUSTRATIVE EMBODIMENT

Referring to the drawings, an oven pan 10 is illustrated therein, having a bottom 12, side walls comprising opposed end walls 14, 16 and opposed sides 18 and 20. A peripheral rim 22 is formed at the end of the side walls. The pan with its bottom, side walls and rim is formed from a unitary sheet of stamped aluminum, having a thickness between 0.003 inch and 0.005 inch, preferably 0.004 inch. Although a rectilinear pan is illustrated, alternatively the pan could have a curvilinear configuration with the side walls forming a continuous, endless curve.

A pair of handles 24, 26, formed of cold rolled steel, are fastened to sides of the pan 10. The handles are generally U-shaped, with the ends 28 of the U being fastened at two spaced points 30, 32 on the rim 22, preferably by rivets 34. Other fastening means than rivets could be used if desired, including crimping or adhesive means.

The two spaced points 30, 32 are bridged by stabilizing means 36, comprising an elongated bar formed of cold rolled steel. The bars 36 serve to stabilize the pan 10 and maintain the rim 22 during lifting of the pan with a food product inside of the pan.

Support means 40 are provided for supporting the pan structure. The support means comprise a pair of wires which extend from the rivets 34, adjacent the outside of the side walls 18, 20 and under and adjacent the bottom 12 of the pan. In the illustrative embodiment, the wires 40 are formed of cold rolled steel and have a circular cross-sectional configuration.

It has been found that a pan constructed as described above will have the ability to support far more weight than prior art pans formed of thicker aluminum sheet and not having the steel components that are utilized with the present invention. For example, a prior art oven pan having 0.0065 inch thick aluminum sheet construction has been found to have a capacity of 20 pounds, while the same size pan being formed of thinner aluminum sheet (0.004 inch thick) has been found to be able to support 70 pounds utilizing the handles, stabilizing means and support means of the present invention.

A specific example of a pan that is constructed in accordance with the principles of the present invention comprises a rectilinear oven pan, using aluminum sheet material having a thickness of 0.004 inch, with a bottom 12 dimension of 10.5 inch by 15.5 inch, side walls 14, 16 and end walls 18, 20 being 2.5 inch in height from the bottom, a cold rolled steel handle 24 having a circular cross-sectional configuration with a ⅛ inch diameter. The rivet points 30, 32 are spaced a distance of 5.25 inches and the elongated bars 36 have a length of 6 inches, a width of ¼ inch and a height of 1/16 inch. The support wires 40 have a circular cross-sectional configuration with a diameter of ⅛ inch, and are preferably formed of the same wire as the handles 24, 26.

It has been found that the pan constructed in accordance with the present invention does not have the bending problem concomitant with prior art oven pans and that the oven pan of the present invention can easily be lifted and removed from the oven without requiring handling the hot and clumsy underside of the oven pan.

Although an illustrative embodiment of the invention has been shown and described, it is to be understood that various modifications and substitutions may be made by those skilled in the art without departing from the novel spirit and scope of the present invention.

What is claimed is:

1. An oven pan which comprises:

a disposable stamped aluminum pan structure having a bottom, side walls and a rim at the periphery of the side walls;

a first handle fastened to the rim at a first location thereof;

first means fastening said first handle to two spaced point on the rim:

first stabilizing means connected to said two spaced points;

a second handle fastened to the rim at a second location thereof, opposed to said first location;

second means fastening said second handle to two spaced points on the rim; and second stabilizing means connected to said last-mentioned two spaced points; and support means attached to said first and second stabilizing means, said support means extending from said first handle to said second handle and underlying the bottom of the pan.

2. An oven pan as described in claim 1, said stamped aluminum having a thickness of between 0.003 inch and 0.005 inch.

3. An oven pan as described in claim 1, in which each of said handles has a generally U-shape with said fastening means being connected to the ends of the U.

4. An oven pan as described in claim 1, in which said fastening means comprises rivets.

5. An oven pan as described in claim 1, in which said fastening means comprises crimping.

6. An oven pan as described in claim 1, in which said fastening means comprises adhesive.

7. An oven pan as described in claim 1, said stabilizing means comprising an elongated bar.

8. An oven pan as described in claim 1, said handles and said stabilizing means being formed of steel.

9. An oven pan as described in claim 1, said pan having a rectilinear configuration with said side walls forming two ends and two sides.

10. An oven pan as described in claim 1, said pan having a curvilinear configuration with said side walls forming a continuous, endless curve.

11. An oven pan as described in claim 1, said support means comprising a pair of wires formed to extend adjacent the outside of the side walls and under and adjacent the bottom of the pan.

12. An oven pan as described in claim 11, in which said wires are formed of steel and have a circular cross-sectional configuration.

13. An oven pan, which comprises:

a disposable stamped aluminum pan structure having a bottom, side walls and a rim at the periphery of the side walls, said stamped aluminum having a thickness of between 0.003 inch and 0.005 inch;

a first handle having a generally U-shaped and fastened to the rim at a first location thereof;

first means fastening said first handle at the ends of the U of two spaced points on the rim;

first stabilizing means bridging said two spaced points; a second handle having a generally U-shape fastened to the rim at a second location thereof, opposed to said first location;

second means fastening said second second handle at the ends of the U to two spaced points on the rim;

second stabilizing means bridging said last-mentioned two spaced points;

said first and second stabilizing means each comprising an elongated bar;

said support means attached to the elongated bars and extending from said first handle to said second handle and underlying the bottom of said pan, said support means comprising a pair of wires formed to extend adjacent the outside of the side walls and under and adjacent the bottom of the pan; and said handles and said stabilizing means being formed of steel.

14. An oven pan as described in claim 13, in which said fastening means comprises rivets and in which said wires are formed of steel.

15. An oven pan which comprises:

a disposable stamped aluminum pan structure having a bottom, side walls and a rim at the periphery of the side walls;

first stabilizing means connected to two spaced points on the rim;

second stabilizing means connected to two spaced point on the opposite side of the rim from the first stabilizing means;

support means attached to said first and second stabilizing means, said support means extending from said first stabilizing means to said second stabilizing means and underlying the bottom of the pan.

16. An oven pan as described in claim 15, in which said support means comprises (a) a first wire extending between one of the points to which the first stabilizing means is connected and one of the points to which the second stabilizing means is connected, and (b) a second wire extending between the other point to which the first stabilizing means is connected and the other point to which the second stabilizing means is connected.

*17. An oven pan which comprises:*

*a disposable stamped aluminum pan structure having a bottom, side walls and a rim at the periphery of the side walls;*

*a first handle fastened to the rim at a first location thereof;*

*first means fastening said first handle to the rim;*

*a second handle fastened to the rim at a second location thereof, opposed to said first location;*

*second means fastening said second handle to the rim; and*

*support means extending from said first handle to said second handle and attached thereto and underlying the bottom of the pan.*

*18. An oven pan as described in claim 17, said stamped aluminum having a thickness of between 0.003 inch and 0.005 inch.*

*19. An oven pan as described in claim 17, said support means comprising a pair of wires formed to extend adjacent the outside of the side walls and under and adjacent the bottom of the pan.*

*20. An oven pan as described in claim 19, in which said wires are formed of steel and have a circular cross-sectional configuration.*

*21. An oven pan, which comprises:*

*a disposable stamped aluminum pan structure having a bottom, side walls and a rim at the periphery of the side walls, said stamped aluminum having a thickness of between 0.003 inch and 0.005 inch;*

*a first handle having a generally U-shape and fastened to the rim at a first location thereof;*

*first means fastening said first handle at the ends of the U to the rim;*

*a second handle having a generally U-shape and fastened to the rim at a second location thereof, opposed to said first location;*

*second means fastening said second second handle at the ends of the U to the rim;*

*support means extending from said first handle to said second handle and attached thereto and underlying the bottom of said pan,*

*said support means comprising a pair of wires formed to extend adjacent the outside of the side walls and under and adjacent the bottom of the pan; and*

*said handles and said support means being formed of steel.*

* * * * *